United States Patent [19]

Sugiyama

[11] Patent Number: 4,850,200

[45] Date of Patent: Jul. 25, 1989

[54] REFRIGERATING CIRCUIT DEVICE FOR AIR CONDITIONING APPARATUS AND CONTROL METHOD THEREOF

[75] Inventor: Akiyoshi Sugiyama, Fuji, Japan

[73] Assignee: Kabushiki Kaisha Toshiba, Kawasaki, Japan

[21] Appl. No.: 183,148

[22] Filed: Apr. 19, 1988

[30] Foreign Application Priority Data

Jul. 10, 1987 [JP] Japan ............... 62-172241

[51] Int. Cl.⁴ ............... F25D 21/06; F25B 1/00
[52] U.S. Cl. ............... 62/156; 62/158; 62/227; 62/228.4; 62/229
[58] Field of Search ............... 62/151, 155, 156, 158, 62/160, 227, 228.4, 228.5, 229, 234

[56] References Cited

U.S. PATENT DOCUMENTS

| 4,535,607 | 8/1985 | Mount ............... 62/228.5 X |
| 4,537,042 | 8/1985 | Nishi et al. ............... 62/228.5 X |
| 4,604,872 | 8/1986 | Miyazaki et al. ............... 62/228.4 X |

FOREIGN PATENT DOCUMENTS 61-66038  4/1986  Japan .
62-9140  1/1987  Japan .

*Primary Examiner*—Harry B. Tanner
*Attorney, Agent, or Firm*—Cushman, Darby & Cushman

[57] ABSTRACT

When the temperature of an internal heat-exchanger decreases below a first value in cooling mode, a normal operation, wherein a variable capacity compressor operates in response to the temperature in a space to be cooled, stops temporarily, and a defrost operation, in which the driving frequency of the compressor periodically decreases by a prescribed value until the temperature of the internal heat-exchanger increases above a second value greater than the first value, begins. When the temperature of the internal heat-exchanger increases above a second value greater than the first value, the compressor operates in response to the temperature in the space. When the compressor stops during the defrost operation, the temperature of the internal heat-exchanger is compared with a third value greater than the second value and the operation of the compressor responding to the temperature in the space is inhibited until the temperature of the internal heat-exchanger increases above the third value. When the temperature of the internal heat-exchanger increases above the third value, the compressor operates in response to the temperature in the space. This control operation may prevent the frost from being left on the internal heat-exchanger when the normal operation starts again.

12 Claims, 4 Drawing Sheets

REFRIGERATING CIRCUIT DEVICE FOR AIR CONDITIONING APPARATUS AND CONTROL METHOD THEREOF

BACKGROUND OF THE INVENTION

1. Field of the invention

The present invention relates, in general, to refrigerating circuit devices which control the driving frequency of a variable capacity compressor in response to an air conditioning load in a room to be conditioned. In particular, the invention relates to a refrigerating circuit device which carries out a defrost operation in which the driving frequency of the compressor decreases to remove the frost on the internal heat-exchanger in a cooling mode.

2. Description of the prior art

In air conditioners, frost may adhere and build up on an evaporator (internal heat-exchanger) because of decreace of the refrigerant evaporating temperature, which occurs because of a shortage of refrigerant, or a clogged air filter during cooling operation.

To prevent the formation of frost on the evaporator, in an air conditioner which uses a variable capacity compressor, the driving frequency of the compressor forcibly reduces when the temperature of the evaporator decreases below a prescribed value. One example of this operation is shown in FIGS. 1 and 2. When the temperature Tc of an evaporator detected by a suitable sensor decreases below a prescribed value T1 (from the A area into the B area shown in FIG. 1), a timer begins its counting operation. The driving frequency f of the compressor reduces periodically by a prescribed value every time the timer achieves a prescribed time value t1, as shown in FIG. 2. When temperature Tc increases above the prescribed value T1 (from the B area into the C area), the driving frequency f at which the temperature Tc exceeds the prescribed value T1 is maintained in the C area. After that, when temperature Tc exceeds a second prescribed value T2 (from the C area into the A area), the maintaining of the driving frequency f is cancelled, and a normal operation in which the driving frequency of the compressor varies in response to the air conditioning load in the room is carried out in the A area. The timer counting operation also is cancelled, as shown in FIG. 2. At this time, if the temperature Tc enters from the A area into the B area. and returns from the B area to the A area within the prescribed time tl, the operation of reducing the driving frequency f of the compressor is not carried out.

In the above-described prior art operation, frost builds up on an evaporator in a small air conditioning load during cooling, in spite of the decreasing of the driving frequency described above. This is because the temperature Tc is relatively low, e.g., 6° C., in a small air conditioning load. Under such condition, the driving frequency f approachs zero Hz, and the compressor stops. When the temperature Tc gradually increases and returns to the A area, the compressor re-starts and the normal operation is again carried out. However, if the second prescribed value T2, which is a boundary value between the C area and the A area, is set to a lower value in the above-described operation, the frost still remains on the evaporator when the temperature Tc exceeds the second prescribed value T2 (A area). If the prescribed value T2 is set to a higher value to avoid such a disadvantage, the temperature Tc cannot exceed the second prescribed value T2 (A area) in a normal air conditioning load or in a large air conditioning load.

SUMMARY OF THE INVENTION

Accordingly, it is an object of the present invention to effectively remove the frost adhered on an evaporator during cooling.

It is another object of the present invention to automatically change the operation of a compressor from a defrost operation, in which frost on an evaporator is removed, to a normal operation, in which the driving frequency of the compressor varies in response to the air conditioning load.

It is still another object of the present invention to provide a method for controlling a refrigerating circuit device in a defrost operation.

To accomplish the above objects, a refrigerating circuit device includes an internal heat-exchanger for cooling a space subject to the formating of frost thereon when the temperature of the internal heat-exchanger decreases below a first prescribed value, a variable capacity compressor for compressing a gaseous refrigerant fluid supplied to the internal heat-exchanger, and a temperature sensor for outputting a temperature signal representative of the temperature of the internal heat-exchanger. The refrigerating circuit device further includes a control device for removing the frost on the internal heat-exchanger. The control device includes a defrost device for decreasing the driving frequency of the compressor if the temperature signal is smaller than the first prescribed value, a terminating device for terminating the operation of the defrost device when the temperature signal is greater than a second prescribed value greater than the first prescribed value, a comparing device for comparing the temperature signal with a third prescribed value greater than the second prescribed value if the compressor stops while the operation of the defrost device is executed, and an inhibiting device for inhibiting the operation of the compressor in response to the temperature in the space until the temperature signal is greater than the third prescribed value.

The control device may include a timer for measuring a time elapsed from the time at which the temperature signal becomes smaller than the first prescribed value. The control device may further include a delaying device for delaying the operation of the defrost device until the timer reaches a prescribed time.

BRIEF DESCRIPTION OF THE DRAWINGS

These and other objects and advantages of this invention will become more apparent from the following detailed description of the presently preferred embodiment of the invention, taken in conjunction with the accompanying drawings of which.

DETAILED DESCRIPTION OF THE PREFERRED EMBODIMENT

The preferred embodiment of the present invention will not be described in more detail with reference to the accompanying drawings.

Figure 3:
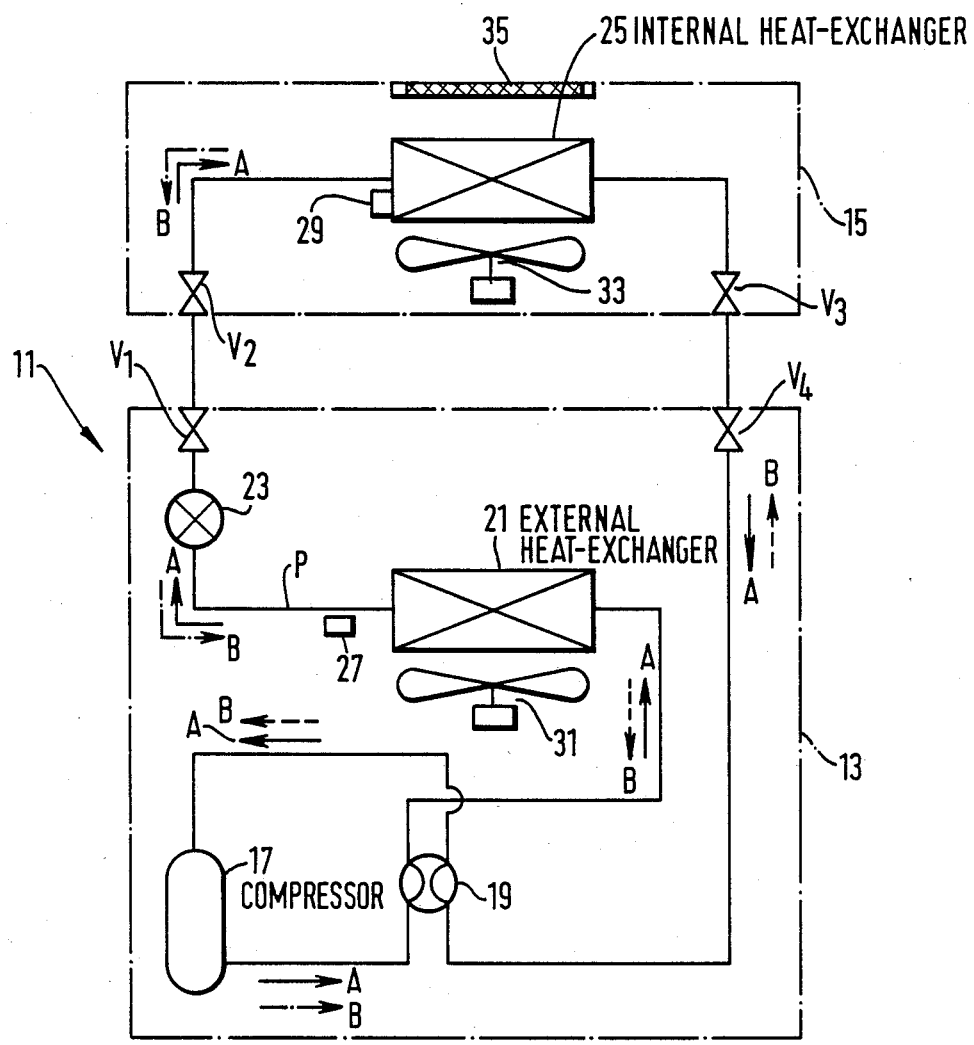
FIG. 3 is a circuit diagram illustrating a refrigerating circuit device of one embodiment of the present invention.

In FIG. 3, a heat-pump type refrigerating circuit 11 includes an external unit 13 and an internal unit 15. External unit 13 includes a variable capacity compressor 17, a four-way valve 19, an external heat-exchanger 21, and a pressure reducing device, e.g., expansion valve 23. Internal unit 15 includes an internal heat-exchanger 25. The output side of compressor 17 is connected to one side of external heat-exchanger 21 through four-way valve 19. The other side of external heat-exchanger 21 is connected to one side of expansion valve 23. The other side of valve 23 is connected to one side of internal heat-exchanger 25 through a first valve V1 of external unit 13 and a second valve V2 of internal unit 15. The other side of internal heat-exchanger 25 is connected to the input side of compressor 17 through a third valve V3 of internal unit 15, a fourth valve V4 of external unit 13 and four-way valve 19. A defrost thermostat (temperature sensor) 27 is attached on a refrigerant pipe P close to external heat-exchanger 21 for detecting the temperature of external heat-exchanger 21. A temperature sensor 29 is attached on the one side of internal heat-exchanger 25 for detecting the temperature Tc of internal heat-exchanger 25. As shown in FIG. 3, an external fan device 31 is oppositely arranged close to external heat-exchanger 21 for supplying air to external heat-exchanger 21. An internal fan device 33 also is disposed close to internal heat-exchanger 25 in internal unit 15 for circulating cooled/heated air through an air filter 35 into the room to be conditioned.

The control circuit of the above-described refrigerating circuit 11 will now be described.

Figure 4:
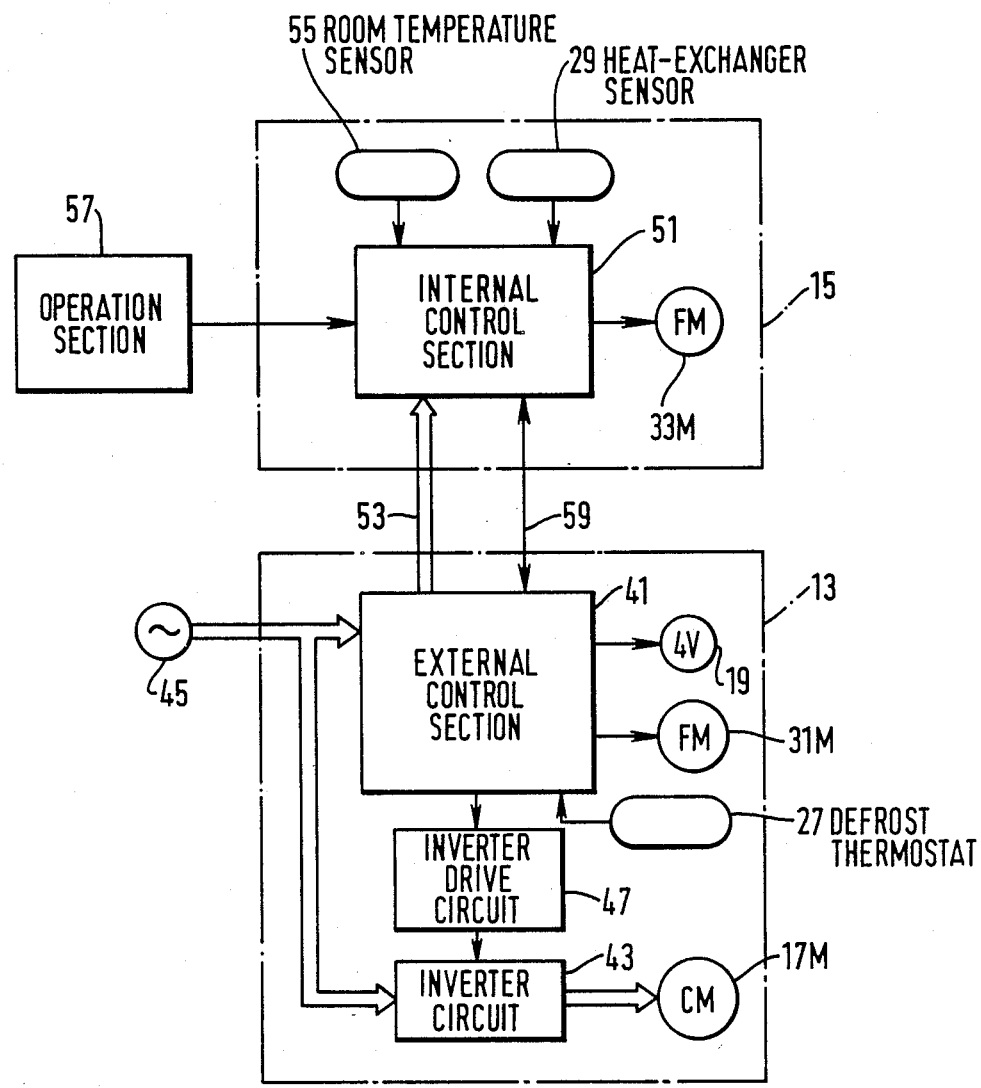
FIG. 4 is a block diagram illustrating the control circuit of the refrigerating circuit device shown in FIG. 3.

In FIG. 4, an external control section 4i and an inverter circuit 43 are connected to an AC power supply 45. External control section 43 includes a microcomputer and its environmental circuits (not shown) for controlling four-way valve 19, a fan motor 31M of external fan device 3!, and an inverter drive circuit 47. An output of defrost thermostat 27 is input to external control section 41. The AC voltage from AC power supply 45 is rectified, and is inverted into an AC drive voltage having a prescribed frequency in inverter circuit 43 in accordance with a switching signal from inverter drive circuit 47. The AC drive voltage is applied to a motor 17M of compressor 17. External control section 41, inverter drive circuit 47 and inverter circuit 43 are arranged in external unit 13.

As shown in FIG. 4, an internal control section 51 including a microcomputer and its environmental circuits (not shown) is arranged in internal unit 15. A power line 53 is connected between internal control section 51 and external control section 41 for supplying an AC voltage from external control section 41 to internal control section 51. An output signal of temperature sensor 29 is output to internal control section 51. An output signal of a room temperature sensor 55 is fed to internal control section 51. An operation section 57 is connected to internal control section 51. A user may input desired data, such as, e.g., room temperature, operation time, etc., into internal control section 51 through operation section 57. Internal control section 51 controls a fan motor 33M of internal fan device 33 in accordance with the output signal from room temperature sensor 55 and the input data from operation section 57. A serial signal line 59 is connected between internal control section 51 and external control section 41 for mutually transmitting each data therebetween in synchronism with the frequency of AC power supply 45.

The operation of the above-described control circuit will now be described hereafter. Firstly, an appropriate start operation is carried out. For example, a cooling mode and a desired room temperature Ts are set to internal control section 51 through operation section 57. Responding to the start operation, motor 17M of compressor 17 is driven by inverter circuit 43 in accordance with a start signal fed from internal control section 51 through external control section 41. Fan motor 33M of internal fan device 33, and fan motor 31M of external fan device 31 are individually driven by corresponding control sections 51 and 41. In the cooling mode, refrigerant flows in the direction indicated by arrow A. Therefore, external heat-exchanger 21 acts as a condenser, and internal heat-exchanger 25 acts as an evaporator. During the cooling operation, internal control section 51 calculates the difference Td between the desired room temperature Ts and the actual room temperature Ta detected by room temperature sensor 55, and outputs a frequency set signal, representative of the difference Td, to external control section 41 through serial signal line 59. External control section 41 controls inverter circuit 43 through inverter drive circuit 47 in accordance with the frequency set signal. Inverter circuit 43 supplies motor 17M of compressor 17 an AC voltage having a prescribed frequency corresponding to the frequency set signal. Therefore, compressor 17 drives at a suitable cooling capacity corresponding to the air conditioning load in the room.

Figure 1:
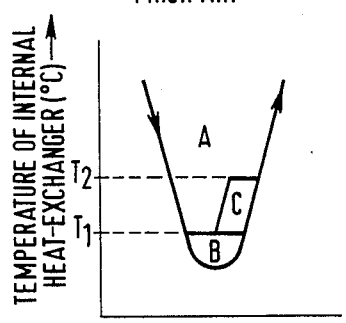
FIG. 1 is a graph illustrating the relationship between the operation of a conventional refrigerating circuit device and the temperature of an internal heat-exchanger of the conventional refrigerating circuit device.
Figure 5:
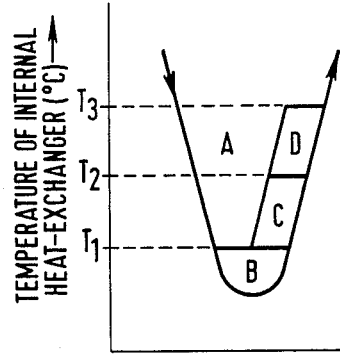
FIG. 5 is a graph illustrating the relationship between the operation of the refrigerating circuit device shown in FIGS. 3 and 4.
Figure 2:
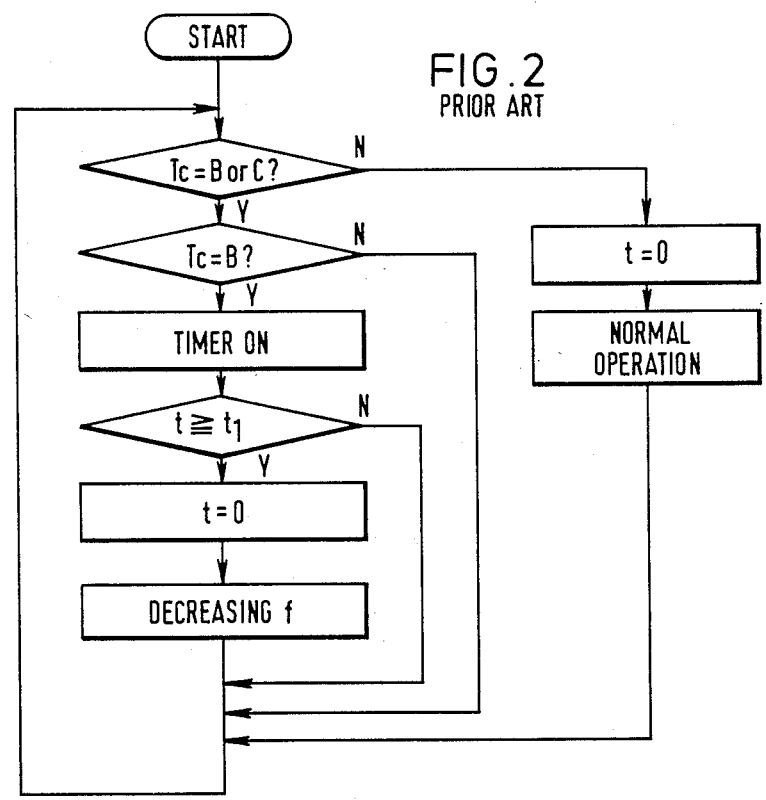
FIG. 2 is a flow-chart illustrating the defrost operation of the conventional refrigerating circuit device based on the graph shown in FIG. 1.

In particular, in the cooling operation the temperature Tc of internal heat-exchanger 25 (evaporator) is detected by temperature sensor 29, and the detected temperature Tc is compared with a first prescribed value T1, e.g., −2° C., in internal control section 51. When a normal operation is carried out in which compressor 17 is driven in response to the air conditioning load the temperature Tc of internal heat-exchanger 25 has been in the A area shown in FIG. 5. During the cooling operation, if filter 35 is clogged with dust, for example, the circulating air is blocked by the clogged filter 35. Therefore, the refrigerant evaporating temperature of internal heat-exchanger 25 decreases, and frost adheres on internal heat-exchanger 25.

Figure 6:
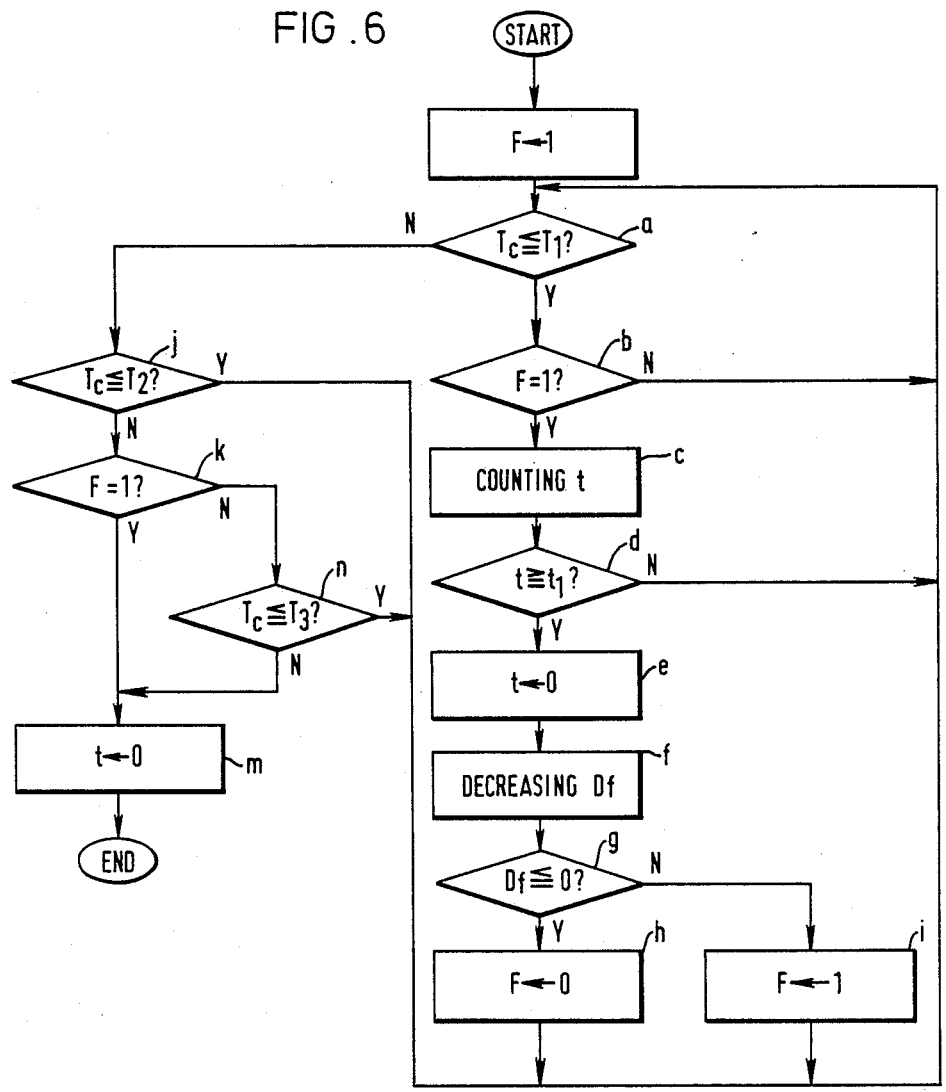
FIG. 6 is a flow-chart illustrating the defrost operation of the refrigerating circuit device of one embodiment based on the graph shown in FIG. 5.

As shown in FIG. 6, a defrost operation is carried out if the temperature Tc of internal heat-exchanger 25 decreases below a first prescribed value T1 (from A area to B area). The defrost operation is initialized such that a flag status F is set to one. In step a, the temperature Tc is compared with the first prescribed value T1. If temperature Tc is less than first prescribed value T1, the YES-path is taken. Otherwise, the NO-path is taken. If flag status F is one when the YES-path is taken, the YES-path is taken in step b. Otherwise, the NO-path is taken. When the YES-path is taken in step b, a timer (not shown) in internal control section 51 starts the measuring of the time t elapsed from the time at which the temperature Tc decreases below the first prescribed value T1 (step c). In step d. the time elapsed t measured by the timer is compared with a prescribed time value t1, e.g., 2 minutes. If the time t elapsed is greater than tI, the YES-path is taken. Otherwise, the NO-path is taken. When the NO-path is taken in step d. the above-described steps a, b. c and d are repeatedly executed until either the timer achieves the prescribed time value t1 (step d) or the temperature Tc increases above the first prescribed value T1 (step a). When the YES-path is taken in step d, the timer is reset in step e. In step f, the driving frequency Df fed from inverter circuit 43 to compressor motor 17M is reduced by a prescribed value, e.g., 5 Hz. Therefore, the cooling capacity of compressor 17 reduces At this time, if the amount of frost on internal heat-exchanger 25 is small, the temperature Tc of the internal heat-exchanger 25 eventually rise, and the driving frequency Df may not reach zero even though the driving frequency Df is periodically reduced. Thus compressor 17 may continue to operate. However, compressor 17 eventually stops when a large amount of frost forms on internal heat-exchanger 25, because the temperature Tc of internal heat-exchanger 25 cannot easily rise.

In step g, if the driving frequency Df is zero, the YES-path is taken. Otherwise, the NO-path is taken. When the YES-path is taken in step g, the flag status F is set to zero in step h. When the NO-path is taken in step g, the flag status F is set to one in step i. The above-described steps are re-executed sequentially. At this time, when the temperature Tc increases above first prescribed value T1, the NO-path is taken in step a. In step j, the temperature Tc is further compared with a second prescribed value T2, e.g., 3° C., greater than the first prescribed value T1. If the temperature Tc is less than the second prescribed value T2, the YES-path is taken. The above-described steps a and j are repeatedly executed until the temperature Tc increases above the second prescribed value T2 in step j. When the temperature Tc is greater than the second prescribed value T2 in step j, the NO-path is taken. In step k, if compressor i7 has not stopped during the defrost operation (F=one) the YES-path is taken. The timer is reset (step m), and the above-described defrost operation is completed. The normal operation then re-starts. However, if compressor 17 has stopped during the defrost operation (F=zero), the NO-path is taken in step k. The temperature Tc is compared with a third prescribed value T3, e.g., 12° C., greater than the second prescribed value T2 in step n. If temperature Tc is less than third prescribed value T3, the YES-path is taken. The above-described steps a, j, k and n are repeatedly executed until the temperature Tc increases above the third prescribed value T3. When the temperature Tc is greater than the third prescribed value T3 in step n, the NO-path is taken. The timer is reset (step m}, and the defrost operation is ended.

As shown in FIG. 6, it should be noted that if the temperature Tc rises again above the second prescribed value T2 (A area) within a prescribed period, e.g., 2 minutes, after the temperature Tc has decreased below the first prescribed value T1 (B area), the timer is reset and the above-described defrost operation is not carried out.

In the above-described defrost operation, when the temperature Tc of internal heat-exchanger 25 increases above the second prescribed temperature value T2 (D area), and the flag status F is one (steps j and k), internal control section 51 temporarily operates as if the temperature Tc of internal heat-exchanger 25 had fallen into the A area, and the normal operation is carried out immediately after the defrost operation terminates. Morever, when the temperature Tc of internal heat-exchanger 25 increases above the second prescribed value T2 (D area), and the flag status F is zero, internal control section 51 temporarily operates as if the temperature Tc of internal heat-exchanger 25 had fallen in the C area. Thus, the defrost operation continues. At the same time, the temperature Tc is compared with the third prescribed value T3 greater than T2 (step n). When the temperature Tc increases above the third prescribed value T3 (A area), the normal operation is carried out immediately after the defrost operation terminates.

With the above-described embodiment, when the temperature Tc of internal heat-exchanger 25 decreases, and frost adheres on internal heat-exchanger 25, the driving frequency Df fed to compresser 17 periodically decreases by a prescribed value. Therefore, the cooling capacity of compressor 17 reduces, and the frost adhered on internal heat-exchanger 25 may evaporate. In particular, in this embodiment. the temperature value Tc is compared with the third prescribed value T3 greater than the second prescribed value T2 when compressor 17 stops while the defrost operation is being executed, as described above. Therefore, the normal opera&ion may be carried out without leaving any frost on internal heat-exchanger 25 when the temperature Tc of internal heat-exchanger 25 reaches the third prescribed value T3.

The present invention has been described with respect to the specific embodiment. However, other embodiments based on the principles of the present invention should be obvious to those of ordinary skill in the art. Such embodiments are intended to be covered by the claims.

What is claimed is:

1. A refrigerating circuit device comprising:
   an internal heat-exchanger having a variable temperature for cooling a space, the internal heat-exchanger subject to the formation of frost thereon when the temperature of the internal heat-exchanger decreases below a prescribed temperature;
   variable capacity compressing means having a variable driving frequency for compressing a gaseous refrigerant fluid supplied to the internal heat-exchanger;
   temperature detecting means for outputting a temperature signal representative of the temperature of the internal heat-exchanger; and
   control means for removing the frost on the internal heat-exchanger, the control means including,
      defrost means for decreasing the driving frequency of the variable capacity compresssing means if the temperature signal is smaller than a first prescribed value,
      means for terminating the operation of the defrost means when the temperature signal is greater than a second prescribed value greater than the first prescribed value and the driving frequency throughout the operation is greater than zero,
      means for comparing the temperature signal with a third prescribed value greater than the second prescribed value if the variable capacity compressing means stops while the operation of the defrost means is carried out, and means for inhibiting the operation of the variable capacity compressing means responding to the temperature in the space until the temperature signal is greater than the third prescribed value.

2. A device according to claim 1, wherein the variable capacity compressing means includes a variable capacity compressor and an inverter circuit supplying the variable driving frequency to the compressor.

3. A device according to claim 2, wherein the control means includes an internal control section and an external control section, the internal control section transmitting the temperature signal from the temperature detecting means to the external control section, the external control section controlling the inverter circuit in response to the temperature signal.

4. A device according to claim 1, wherein the control means includes timer means for measuring a time elapsed from the time at which the temperature signal becomes smaller than the first prescribed value.

5. A device according to claim 4, wherein the control means further includes means for delaying the operation of the defrost means until the timer means reaches a predetermined time.

6. A device according to claim 1 further including an external heat-exchanger and an expansion valve connected in series.

7. A device according to claim 6 further including means for changing the direction of the gaseous refrigerant fluid from the variable capacity compressing means.

8. A device according to claim 1 further including an operation section for inputting desired data into the internal control section therethrough.

9. A device according to claim 1, wherein the control includes means for maintaining the driving frequency at its current value when the temperature signal is larger than the first prescribed value until the temperature signal is greater than the second prescribed value.

10. A refrigerating circuit device for an air conditioning apparatus having an internal unit and an external unit, the device comprising:

an internal heat-exchanger arranged in the internal unit and having a variable temperature for cooling a space, the internal heat-exchanger subject to the formation of frost thereon when the temperature of the internal heat-exchanger decreases below a prescribed temperature;

an internal control section arranged in the internal unit;

a temperature detection sensor attached to the internal heat-exchanger for outputting a temperature signal to the internal control section indicating the temperature of the internal heat-exchanger;

a variable capacity compressor disposed in the external unit for compressing a gaseous refrigerant fluid supplied to the internal heat-exchanger;

an inverter circuit for supplying a variable driving frequency to the compressor; and an external control section arranged in the external unit, the external control section including, defrost means for decreasing the driving frequency of the inverter circuit if the temperature signal from the internal control section is smaller than a first prescribed value, means for maintaining the driving frequency from the inverter circuit at its current value when the temperature signal is greater than the first prescribed value until the temperature signal is greater than a second prescribed value greater than the first prescribed value, means for terminating the operation of the defrost means when the temperature signal is greater than the second prescribed value and the driving frequency throughout the operation is greater than zero, means for comparing the temperature signal with a third prescribed value greater than the second prescribed value if the variable capacity compressor stops during the operation of the defrost means, means for inhibiting the operation of the variable capacity compressor until the temperature signal is greater than the third prescribed value, timer means for measuring a time elapsed from the time at which the temperature signal becomes smaller than the first prescribed value, and means for delaying the operation of the defrost means until the timer means reaches a predetermined time.

11. A method for controlling a refrigerating circuit device having a variable capacity compressor operating in response to changes in the temperature in a space being cooled, and an internal heat-exchanger for cooling the space, including the steps of:

incrementally decreasing the driving frequency of the compressor successively at a prescribed time intervals when the internal heat-exchanger temperature falls below a first prescribed temperature;

maintaining the driving frequency at its current level when the internal heat-exchanger temperature exceeds the first prescribed temperature until the internal heat-exchanger temperature exceeds a second prescribed temperature higher than the first prescribed temperature;

inhibiting further operation of the compressor responding to the temperature in the space while the internal heat-exchanger temperature is less than a third prescribed temperature higher than the second prescribed temperature only if the compressor stopped operating while the driving frequency was being incrementally decreased.

12. A method according to claim 11 further including the step of delaying the decrease of the driving frequency for a predetermined time after the internal heat-exchanger temperature falls below the first prescribed temperature.

* * * * *